US010823075B2

(12) United States Patent
Glahn et al.

(10) Patent No.: US 10,823,075 B2
(45) Date of Patent: Nov. 3, 2020

(54) OIL COKING MITIGATION IN A GAS TURBINE ENGINE

(71) Applicant: United Technologies Corporation, Farmington, CT (US)

(72) Inventors: Jorn A. Glahn, Manchester, CT (US); Denman H. James, West Hartford, CT (US); Amy R. Grace, Eilington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 615 days.

(21) Appl. No.: 15/160,365

(22) Filed: May 20, 2016

(65) Prior Publication Data

US 2017/0335770 A1 Nov. 23, 2017

(51) Int. Cl.
*F02C 7/24* (2006.01)
*F01D 21/14* (2006.01)
(Continued)

(52) U.S. Cl.
CPC ............... *F02C 7/24* (2013.01); *F01D 21/12* (2013.01); *F01D 21/14* (2013.01); *F01D 25/18* (2013.01); *F02C 3/04* (2013.01); *F02C 7/06* (2013.01); *F02C 7/14* (2013.01); *F02C 7/224* (2013.01); *F02C 7/32* (2013.01); *F02C 9/28* (2013.01); *F05D 2220/32* (2013.01); *F05D 2260/213* (2013.01); *F05D 2260/81* (2013.01); *F05D 2260/821* (2013.01); *F05D 2260/98* (2013.01); *F05D 2270/112* (2013.01);
(Continued)

(58) Field of Classification Search
CPC .......... F01D 21/06; F01D 21/00; F01D 21/12; F01D 25/18; F02C 9/28
See application file for complete search history.

(56) References Cited

U.S. PATENT DOCUMENTS

| | | | | | |
|---|---|---|---|---|---|
| 4,020,632 | A | * | 5/1977 | Coffinberry | F02C 7/14 |
| | | | | | 123/41.33 |
| 8,261,527 | B1 | * | 9/2012 | Stearns | F02C 7/06 |
| | | | | | 60/39.08 |

(Continued)

FOREIGN PATENT DOCUMENTS

| | | |
|---|---|---|
| FR | 3027061 A1 | 4/2016 |
| WO | 2016/055738 A1 | 4/2016 |

OTHER PUBLICATIONS

Extended European Search Report for Application No. 17171801.8-1607 dated Oct. 12, 2017 (7 pp.).
(Continued)

*Primary Examiner* — Steven M Sutherland
*Assistant Examiner* — Thuyhang N Nguyen
(74) *Attorney, Agent, or Firm* — Cantor Colburn LLP

(57) ABSTRACT

According to an aspect, a method includes predicting, by a processor, a projected oil-wetted metal temperature in a lubrication system of a gas turbine engine at shutdown based on one or more thermal models prior to shutdown of the gas turbine engine. The processor determines a coking index based on the projected oil-wetted metal temperature and a coking limit threshold associated with one or more engine components. An oil coking mitigation action is triggered as a shutdown management event of the gas turbine engine based on the coking index.

18 Claims, 5 Drawing Sheets

(51) Int. Cl.
    *F02C 7/224*    (2006.01)
    *F01D 21/12*    (2006.01)
    *F02C 7/14*     (2006.01)
    *F01D 25/18*    (2006.01)
    *F02C 9/28*     (2006.01)
    *F02C 3/04*     (2006.01)
    *F02C 7/06*     (2006.01)
    *F02C 7/32*     (2006.01)

(52) U.S. Cl.
    CPC .. *F05D 2270/303* (2013.01); *F05D 2270/304* (2013.01); *Y02T 50/60* (2013.01)

(56) References Cited

U.S. PATENT DOCUMENTS

| | | | |
|---|---|---|---|
| 8,328,509 B2 * | 12/2012 | Gee | F01D 11/003 415/180 |
| 8,534,044 B2 * | 9/2013 | Smith | F02C 7/14 60/267 |
| 2015/0361887 A1 | 12/2015 | Stearns et al. | |
| 2017/0191419 A1 * | 7/2017 | Bayraktar | F02C 7/18 |
| 2017/0301157 A1 * | 10/2017 | Descubes | F01D 21/00 |

OTHER PUBLICATIONS

EP Application No. 17171801.8 Office Action dated May 6, 2020, 4 pages.

\* cited by examiner

OIL COKING MITIGATION IN A GAS TURBINE ENGINE

BACKGROUND

This disclosure relates to turbine engines, and more particularly to oil coking mitigation in a gas turbine engine.

Lubrication systems in modern gas turbine engines face the challenge of high temperature environments. Lubrication systems transfer heat from a number of components to one or more heat exchangers while oil is circulating during engine operation. Once an engine is shut down and the oil is not circulating, heat from the turbomachinery can be transferred to the oil without an adequate means of dissipating the heat from the oil. Under certain conditions, this thermal soak-back can lead to oil coking in one or more bearing compartments or other areas of the engine.

BRIEF DESCRIPTION

According to an embodiment, a method includes predicting, by a processor, a projected oil-wetted metal temperature in a lubrication system of a gas turbine engine at shutdown based on one or more thermal models prior to shutdown of the gas turbine engine. The processor determines a coking index based on the projected oil-wetted metal temperature and a coking limit threshold associated with one or more engine components. An oil coking mitigation action is triggered as a shutdown management event of the gas turbine engine based on the coking index.

In addition to one or more of the features described above, or as an alternative to any of the foregoing embodiments, further embodiments may include where the one or more thermal models determine one or more modeled temperatures of the one or more engine components based on at least one sensed engine temperature, a sensed rotor speed of the gas turbine engine, and at least one gas path temperature of the gas turbine engine.

In addition to one or more of the features described above, or as an alternative to any of the foregoing embodiments, further embodiments may include where the projected oil-wetted metal temperature is determined based on at least one sensed oil temperature.

In addition to one or more of the features described above, or as an alternative to any of the foregoing embodiments, further embodiments may include sensing a fuel temperature in a fuel system of the gas turbine engine, where the fuel system is in thermal communication with the lubrication system.

In addition to one or more of the features described above, or as an alternative to any of the foregoing embodiments, further embodiments may include where the oil coking mitigation action includes increasing fuel recirculation within the fuel system to increase oil-to-fuel heat transfer.

In addition to one or more of the features described above, or as an alternative to any of the foregoing embodiments, further embodiments may include where the oil coking mitigation action includes actuating a fuel-return-to-tank valve to reduce generator heat loading on the lubrication system.

In addition to one or more of the features described above, or as an alternative to any of the foregoing embodiments, further embodiments may include where the oil coking mitigation action includes increasing fuel flow beyond engine demands to increase cooling capacity of the fuel system with respect to the lubrication system.

In addition to one or more of the features described above, or as an alternative to any of the foregoing embodiments, further embodiments may include where the oil coking mitigation action includes opening an air/oil cooler valve to increase air flow in an air/oil cooler of the lubrication system.

In addition to one or more of the features described above, or as an alternative to any of the foregoing embodiments, further embodiments may include where the oil coking mitigation action includes reducing or shifting electrical generator loads of the gas turbine engine.

In addition to one or more of the features described above, or as an alternative to any of the foregoing embodiments, further embodiments may include where the oil coking mitigation action includes increasing an idle dwell time prior to shutdown based on determining that the gas turbine engine is operating in a test mode.

According to an embodiment, a thermal management system of a gas turbine engine is provided. The thermal management system includes a lubrication system with an oil flow path between a plurality of engine components and a controller operable to predict a projected oil-wetted metal temperature in the lubrication system at shutdown of the gas turbine engine based on one or more thermal models prior to shutdown of the gas turbine engine. The controller is operable to determine a coking index based on the projected oil-wetted metal temperature and a coking limit threshold associated with one or more of the engine components. The controller is further operable to trigger an oil coking mitigation action as a shutdown management event of the gas turbine engine based on the coking index.

Technical effects include predictively triggering one or more oil coking mitigation actions to prevent and/or reduce oil coking risks associated with engine shutdown.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments assess a risk of oil coking for one or more engine components using one or more thermal models prior to shutdown of a gas turbine engine. A controller can predictively trigger various accommodation actions to mitigate the risk of oil coking in the gas turbine engine.

Figure 1:
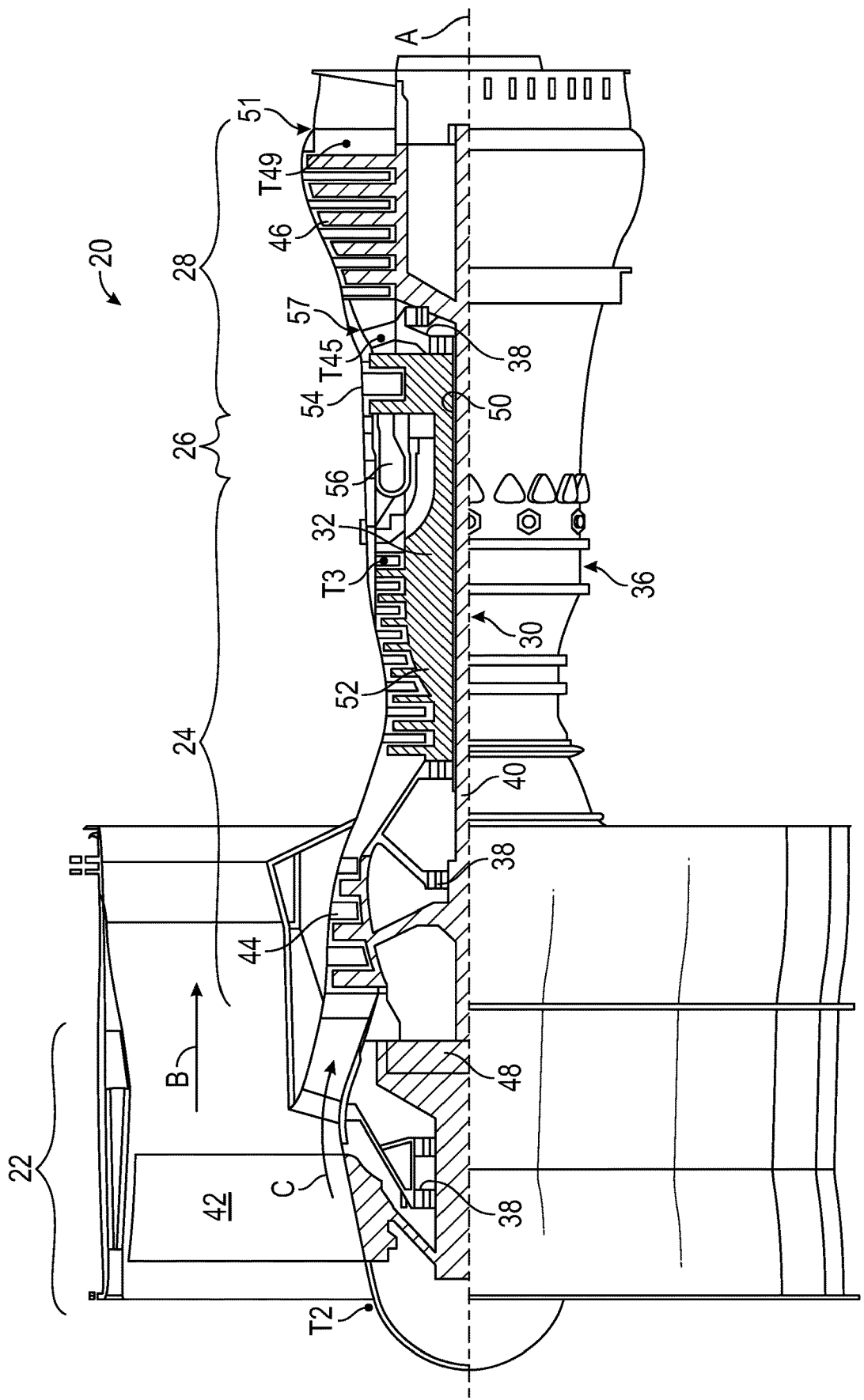
FIG. 1 is a sectional view of one example of a gas turbine engine according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame (MTF) 57 of the engine static structure 36 is arranged generally between the high pressure turbine 54 and the low pressure turbine 46. The MTF 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

A number of stations for temperature measurement/computation are defined with respect to the gas turbine engine 20 according to conventional nomenclature. Station 2 is at an inlet of low pressure compressor 44 having a temperature T2. Station 3 is at an inlet of the combustor 56 having a temperature T3. Station 4.5 is proximate to a bearing compartment mounted at MTF 57 having a temperature T45. Station 4.9 is proximate to a bearing compartment at a turbine exhaust case (TEC) 51 having a temperature T49. Other station positions known in the art may also be used in various embodiments for sensed and/or modeled temperature determination.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
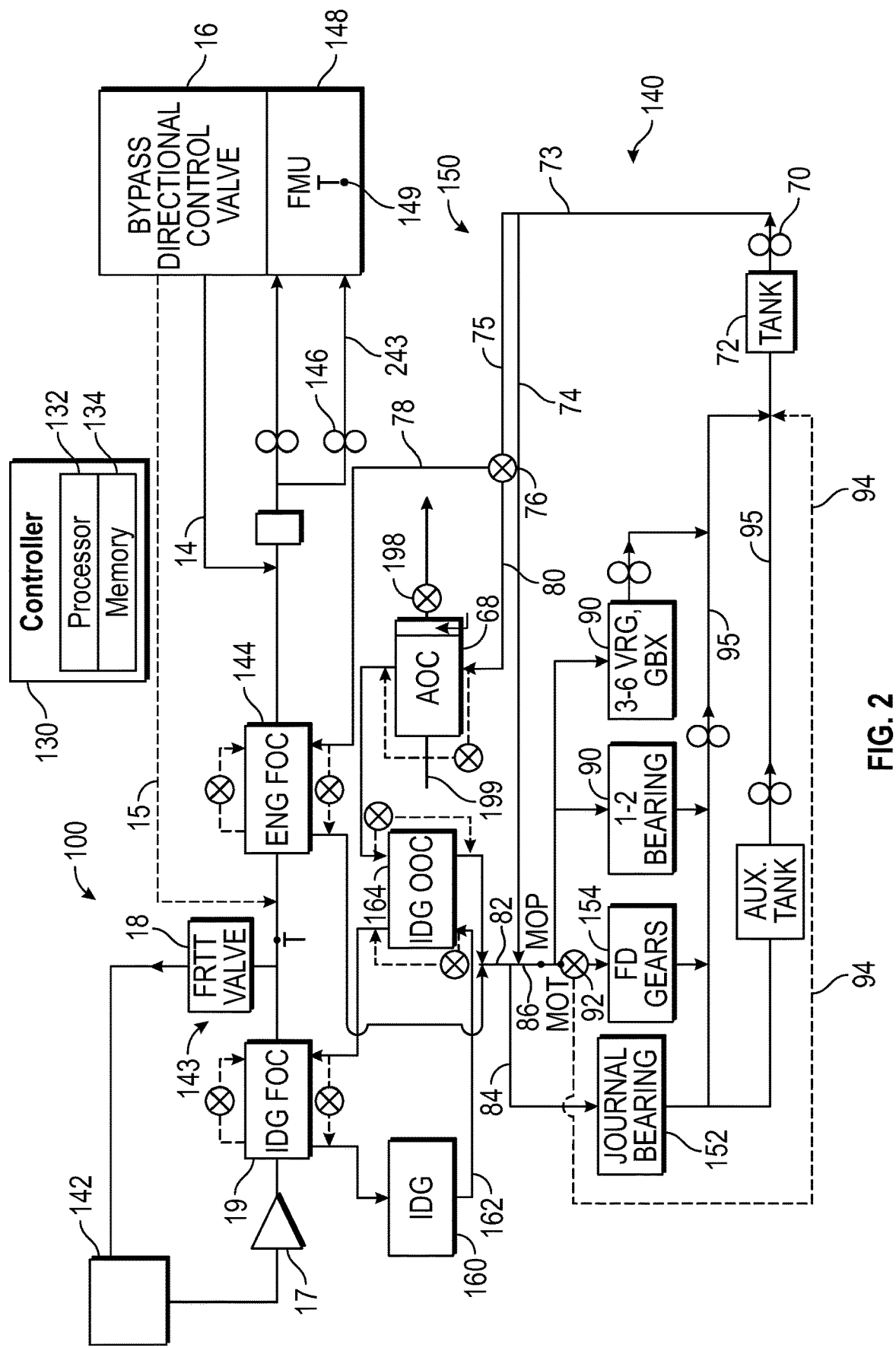
FIG. 2 is a schematic of a thermal management system of a gas turbine engine according to an embodiment.

FIG. 2 illustrates a thermal management system 100 for the gas turbine engine 20 of FIG. 1. The thermal management system 100 includes a lubrication system 140 and a fuel system 143. The lubrication system 140 is utilized in association with the fuel system 143, and an integrated drive generator ("IDG") 160 and its oil cooling system circuit 162. The IDG 160 is one example of a generator. Embodiments can include one or more alternate generator configurations known in the art, such as a variable frequency generator.

Fuel from a fuel tank 142 passes to a fuel/oil cooler 144. The fuel is heated, and cools a lubricant, as will be explained below. A main fuel pump 146 drives the fuel into further fuel lines 243 and then into a fuel management unit ("FMU") 148 associated with a combustor, such as combustor 56 as shown in FIG. 1. It is known in the art to heat the fuel to improve the efficiency of the overall engine. The fuel/oil cooler 144 provides this function.

At the same time, the IDG 160 is driven by turbine rotors to generate electricity for various uses on an aircraft. As shown in oil cooling system circuit 162, the oil from IDG 160 passes through an oil-to-oil cooler 164, and may also thereafter pass through a fuel/oil cooler 19 before returning to the IDG 160.

A boost pump 17 may drive the fuel from the tank 142 through the fuel/oil cooler 19 to heat the fuel, and cool the oil being returned to the IDG 160. A fuel-return-to-tank valve 18 may selectively return fuel to the fuel tank 142. As also shown, a bypass directional control valve 16 selectively bypasses fuel away from the FMU 148 to either upstream or downstream of the engine fuel/oil cooler 144. The main fuel pump 146 may be a fixed displacement pump, and thus is less able to provide precise metering of the fuel being delivered to the FMU. The bypass valve 16 assists in ensuring the proper amount of fuel is delivered. As shown, the fuel may be returned through a line 15 to a location upstream of the fuel/oil cooler 144 under certain conditions, low power for example. Under other conditions, such as high power, the fuel is delivered through a line 14 to a location downstream of the fuel/oil cooler 144. Since the fuel in either line 14 or 15 has already been heated, it may be necessary to provide more cooling to the oil, and thus an air/oil cooler 68 is utilized.

An oil supply system 150 includes a main oil pump 70 taking oil from a main oil tank 72. The terms "oil" and "lubricant" are used interchangeably in this application and cover a fluid used to lubricate surfaces subject to relative rotation. The oil is delivered through a downstream line 73, and split between two lines 74 and 75. Line 74 is sent directly to line 86 without cooling. A modulating valve 76 is controlled to achieve a desired fuel temperature for the oil in line 75. As an example, a sensor 149 may send a signal to a control regarding a sensed temperature of the fuel downstream of the fuel/oil cooler 144. The valve 76 routes the volume of oil between line 78 and 80 to achieve the desired temperature of the fuel.

The oil passing to line 78 passes through the fuel/oil cooler 144 and heats the fuel. The oil is cooled before returning to a common downstream line 82. The downstream line 82 can be called a "cool" oil line, as the oil will be cooler than the oil in "hot" line 74 which has not been cooled in any heat exchanger. For purposes of this application, line 75 is seen as part of the "cool" line even though the lubricant has yet to be cooled.

The oil directed by the valve 76 into line 80 passes through air-to-oil cooler 68 which is exposed to air which is cooler than the oil in line 80, and which cools the oil. Downstream of the air-to-oil cooler 68, the oil passes through the oil-to-oil cooler 164, and may be heated by cooling the oil for the IDG 160. An air/oil cooler valve 198 may be used to control the cooling load at the air/oil cooler 68. The oil reaching line 82 downstream of the oil-to-oil cooler 164 is significantly cooler than the oil in line 74. Some of the oil in line 82 is directed through a line 84, to a journal bearing 152, which is part of the gear reduction 48 of FIG. 1. Thus, cooler oil is supplied to the bearing 152 than is supplied from the line 74. As can be seen, a line 86 branches off of the "cool" line 82 at or near the point at which "cool" line 84 breaks away to go to the journal bearing 152. The lubricant in line 86 mixes with the lubricant in "hot" line 74 but downstream of the branch line 84. As shown, the fan drive gears 154 receive "hot" oil. Alternatively, the fan drive gears 154 may be positioned to receive the cooler oil.

It may be desirable to provide cooler oil to these locations than is necessary to be supplied to bearing compartments 90, or other locations associated with the engine 20. The bearing compartments 90 as shown in FIG. 2 may equate to the several locations of bearings 38 as shown in FIG. 1.

Cooling all of the oil associated with the engine bearing compartments 90 would reduce the overall efficiency of the engine 20. Thus, splitting the oil, and cooling the oil to be directed to the bearing 152 provides cooler oil to those locations, while still allowing the hotter oil to be directed to locations that do not need cooler oil.

In addition, a valve 92 can selectively direct additional oil to the fan drive gears 154 if additional oil is necessary, such as at high power demand times. At other times, the valve 92 may direct lubricant through line 94 back to a return line 95 leading back to the oil tank 72.

The overall configuration thus results in an oil supply system which directs hotter oil to the locations which do not need cooler oil, but which also cools oil to be directed to areas associated with the fan drive gears 154.

A controller 130, which may be implemented within a gas turbine engine controller, such as a Full Authority Digital Engine Controller (FADEC) or other electronic engine controller (EEC), controls the flow of fuel to the combustor 56. To do so, the controller 130 receives various input signals and controls the fuel flow rate to the combustor 56 accordingly. The controller 130 can receive input control signals from, for example, throttle control equipment (not illustrated) in the cockpit, as well as various pressure, temperature, position, and rate signals associated with the thermal management system 100 and other aspects of the gas turbine engine 20 of FIG. 1.

The controller 130 includes one or more processor 132 that can be any type of central processing unit (CPU), including a microprocessor, a digital signal processor (DSP), a microcontroller, an application specific integrated circuit (ASIC), a field programmable gate array (FPGA), or the like. Also, in embodiments, the memory 134 may include random access memory (RAM), read only memory (ROM), or other electronic, optical, magnetic, or any other computer readable medium onto which is stored data and algorithms in a non-transitory form. The controller 130 can include other interfaces (not depicted), such as various communication interfaces, input/output interfaces, power supplies, and the like.

Figure 3:
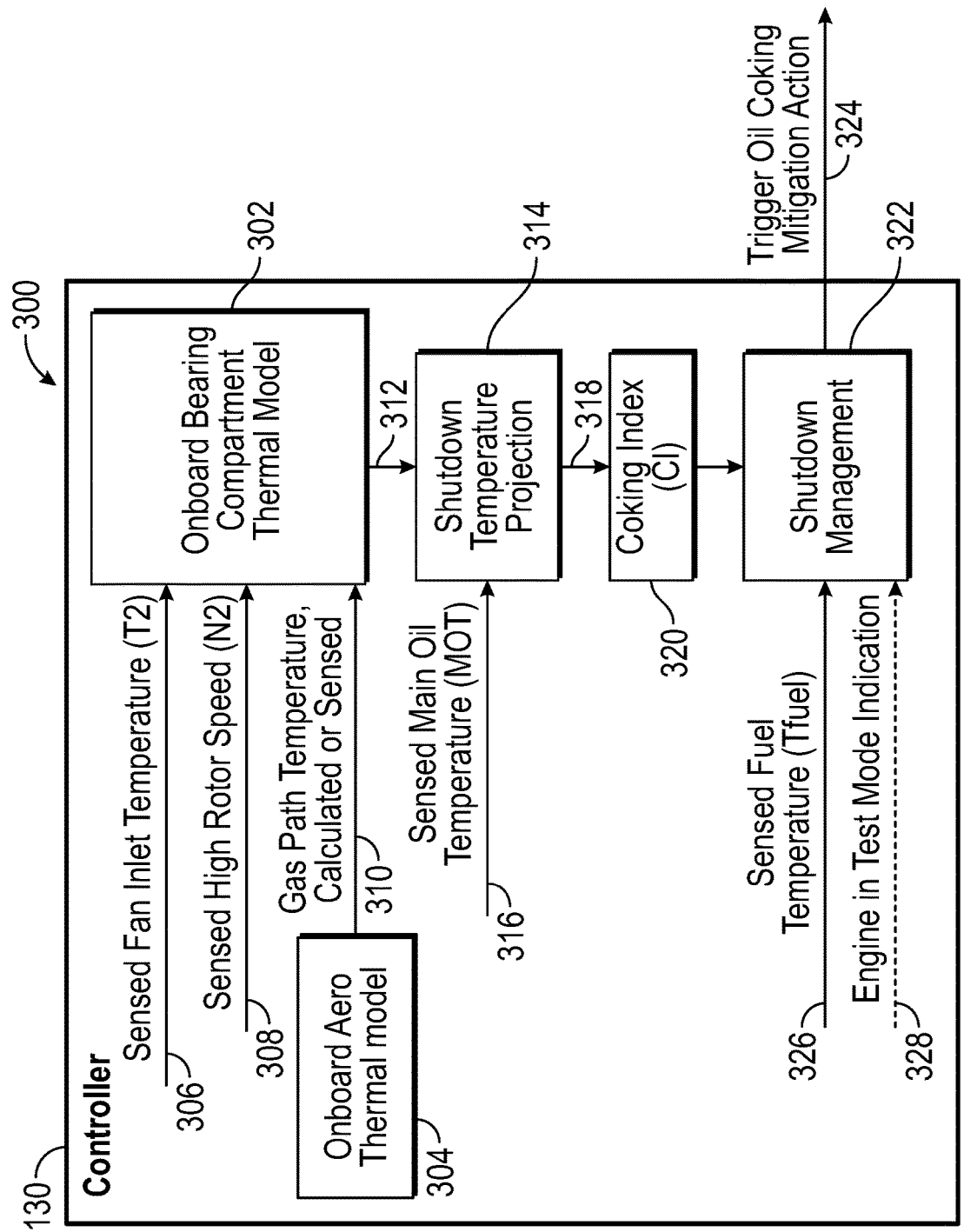
FIG. 3 illustrates a block diagram of a system for oil coking mitigation according to an embodiment.

FIG. 3 depicts a block diagram of a system 300 for oil coking mitigation according to an embodiment that can be implemented in hardware and/or software within controller 130 and/or distributed in one or more other controls (not depicted). For example, one or more models 302, 304 can be implemented in memory 134 by processor 132 of FIG. 2. In the example of FIG. 3, model 302 is an onboard bearing compartment thermal model for one or more of the bearing compartments 90 of FIG. 2. Model 302 receives a sensed fan inlet temperature T2 as at least one sensed engine temperature 306. Model 304 also receives a sensed high rotor speed N2 as sensed rotor speed 308 of the gas turbine engine 20 (e.g., rotational speed of high speed spool 32 of FIG. 1). Model 302 further receives a calculated or sensed gas path temperature 310 from onboard aero thermal model 304 as at least one gas path temperature 310 of the gas turbine engine 20 of FIG. 1. Models 302 and/or 304 can use known relationships between engine parameters to model temperatures at various stations within the engine 20, such as T3, T45, and T49 of FIG. 1 if no sensed temperature is available. Modeled temperatures 312 from model 302 are provided to a shutdown temperature projection 314.

The shutdown temperature projection 314 can predict temperatures at various stations, such as T3, T45, and T49, at various points in time based on a sensed main oil temperature (MOT) 316 and modeled temperatures 312. For instance, operational temperature tracking can be performed at steady-state ground idle to determine average temperatures at bearing compartments 90 (e.g., at MTF 57 of FIG. 1) using sensed/modeled T2 and T45. Time constants and temperature scale factors can be selected based on engine power settings such as high power: take-off, climb, cruise, and reverse, and low power: ground idle, flight idle, approach, descent, decelerate, and touchdown. Each bearing compartment 90 at a different station can have different sets of time constants and temperature scale factors that may be selected according to engine power settings. A mission segment map defining different power settings can be used to map performance parameters and projected/modeled temperatures at specific locations within the gas turbine engine 20.

Figure 4:
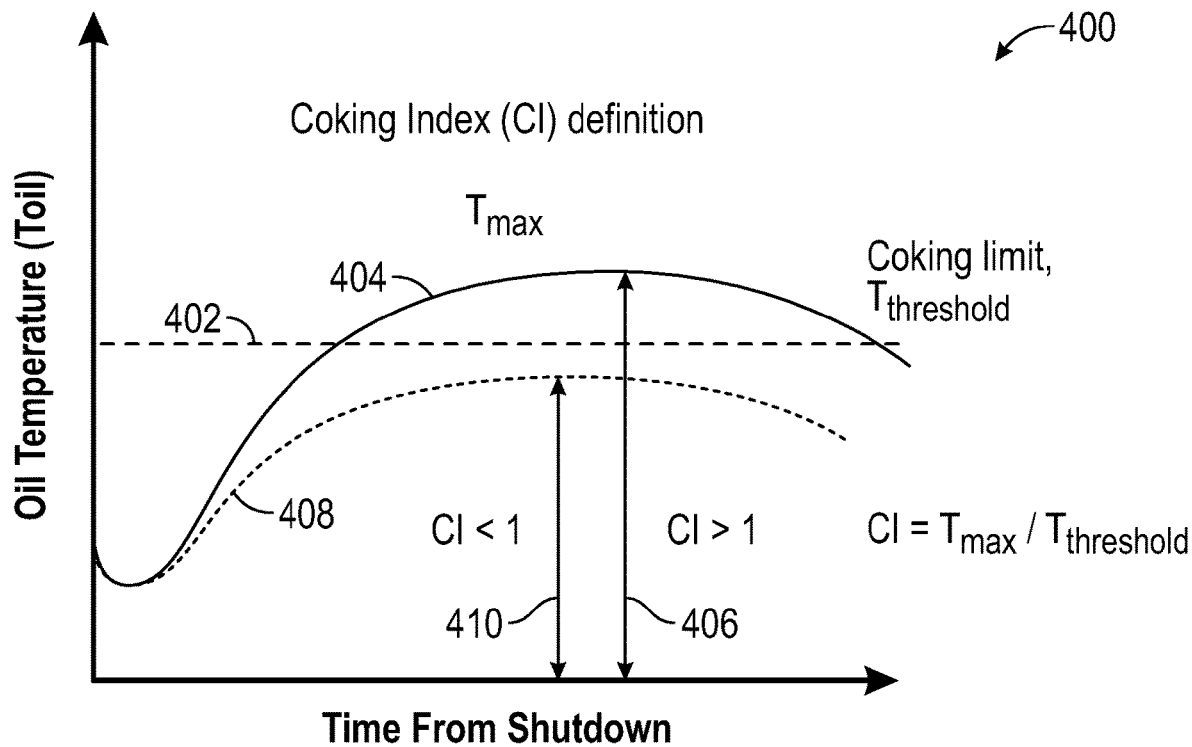
FIG. 4 depicts example plots of oil temperature versus time from shutdown according to an embodiment.

Soak-back temperature projections can use maps, tables, and/or equation sets to predict temperatures in the bearing compartments 90, for example, at and after engine shutdown. An average bearing compartment wall temperature can be estimated from an initial temperature value at shutdown to a time of interest over a defined timescale (e.g., up to several hours after shutdown). A projected oil-wetted metal temperature 318 from the shutdown temperature projection 314 is used to compute a coking index 320. The projected oil-wetted metal temperature 318 predicts compartment wall temperatures, where oil may eventually coke if placed in contact with metal exceeding a temperature threshold. The coking index 320 can be computed according to the coking index definition 400 of FIG. 4 as a maximum projected oil temperature (or oil-wetted metal temperature) (Tmax) divided by a coking limit threshold (Tthreshold) associated with one or more engine components. A coking limit threshold 402 may be a fixed value or set according to lubricant type and/or component type/location. As depicted in the example of FIG. 4, a projected oil temperature (or oil-wetted metal temperature) 404 after shutdown may have a maximum value 406 that exceeds the coking limit threshold 402 (i.e., resulting in a coking index >1), while under other conditions a projected oil temperature (or oil-wetted metal temperature) 408 after shutdown may not have a maximum value 410 that exceeds the coking limit threshold 402 (i.e., resulting in a coking index <1).

Shutdown management 322 of FIG. 3 can examine the coking index 320 and determine whether to trigger an oil coking mitigation action 324 as a shutdown management event of the gas turbine engine 20 based on the coking index 320. For example, if the coking index 320 is less than one, no additional mitigation actions may be needed. However, if the coking index 320 meets or exceeds a value of one, then one or more oil coking mitigation actions 324 may be needed. The specific oil coking mitigation action 324 that is triggered can also depend on a sensed fuel temperature 326 of the fuel system 143 of FIG. 2 (e.g., from sensor 149 of FIG. 2 and/or other sensor upstream from the fuel/oil cooler 144 of FIG. 2), an engine in test mode indication 328, and/or other factors. For instance, if there is sufficient margin in the sensed fuel temperature 326 to take additional heat transfer from the oil without risk of fuel coking, the oil coking mitigation action 324 can include one or more adjustments to the fuel system 143 that increases fuel recirculation, returns fuel to the fuel tank 142, and/or modifies fuel flow to combustor 56.

Figure 5:
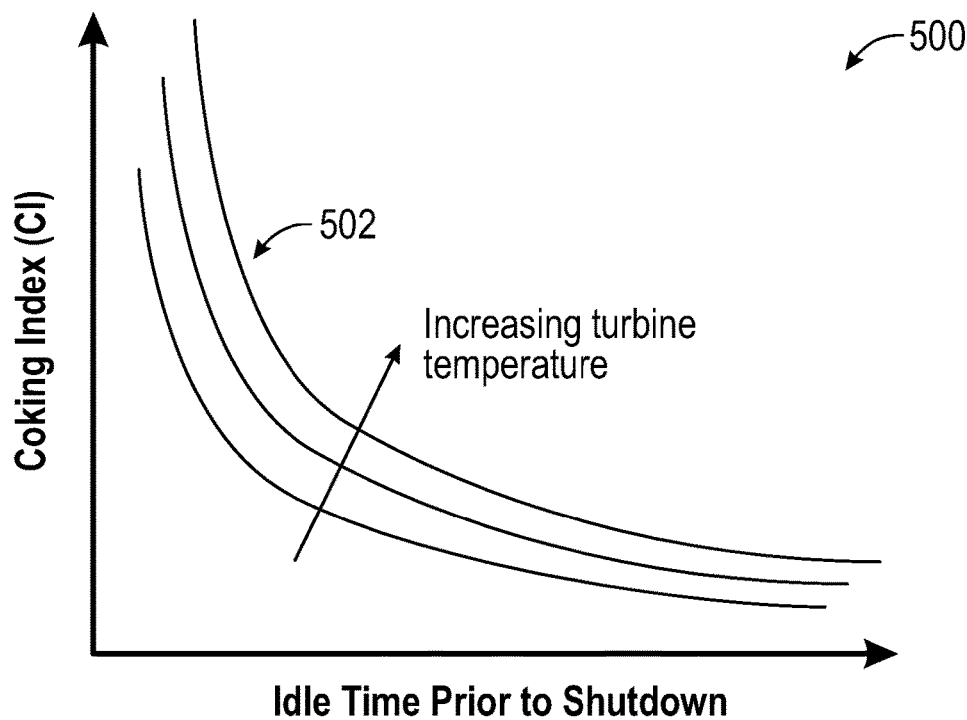
FIG. 5 depicts example plots of coking index versus time for various turbine temperatures according to an embodiment.

During test operations when the gas turbine engine 20 may be put through higher demand scenarios than in normal operation, the oil coking mitigation action 324 can include increasing an idle dwell time prior to shutdown of the engine 20. For example, as depicted in the family of curves 502 FIG. 5, an increase in turbine temperature results in a longer amount of time needed to reduce the coking index 320. Thus, when the engine in test mode indication 328 is set and a non-emergency shutdown is requested, the oil coking mitigation action 324 may hold the engine 20 at idle power until the coking index 320 drops below one and/or other mitigation steps can be performed to ensure that oil coking is prevented.

Figure 6:
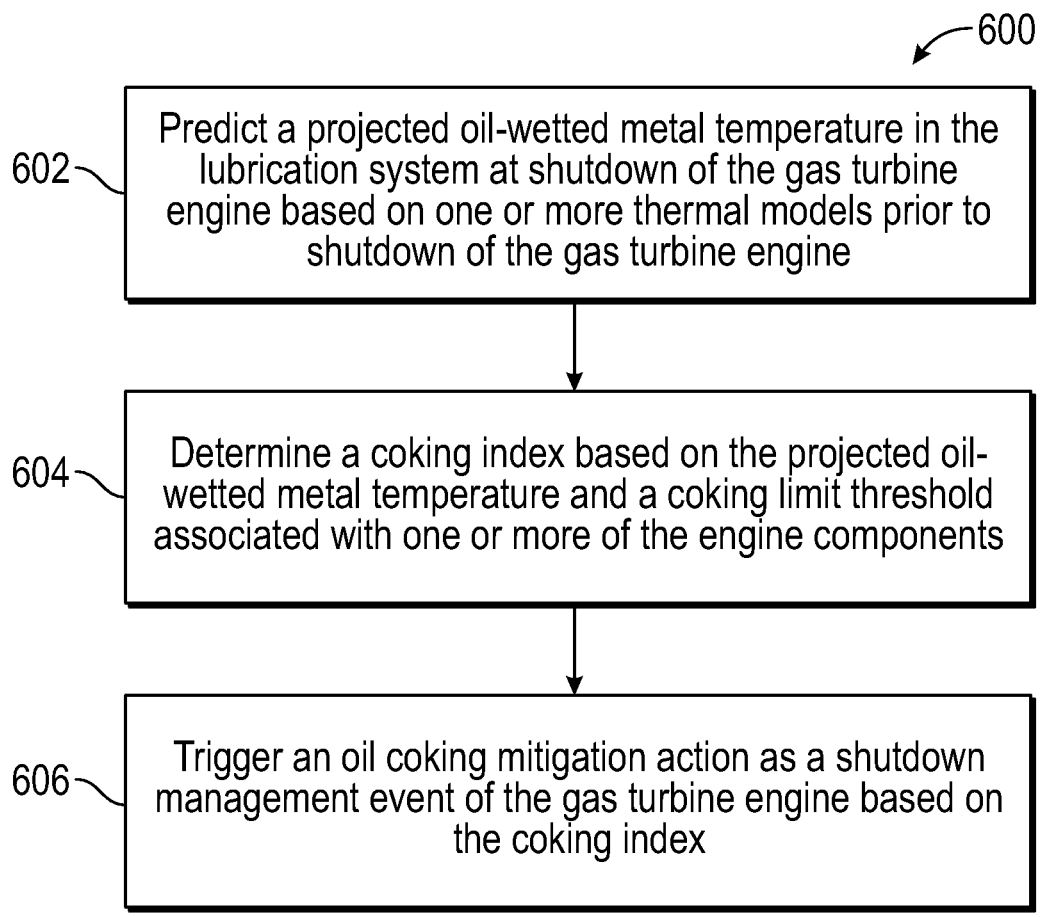
FIG. 6 depicts an oil coking mitigation process according to an embodiment.

FIG. 6 illustrates an oil coking mitigation process 600 according to an embodiment. The process 600 of FIG. 6 is described in reference to FIGS. 1-6 and may be performed with an alternate order and include additional steps. At block 602, controller 130 predicts a projected oil-wetted metal temperature 318 in the lubrication system 140 at shutdown of the gas turbine engine 20 based on one or more thermal models 302, 304 prior to shutdown of the gas turbine engine 20. The one or more thermal models 302, 304 can determine one or more modeled temperatures 312 of the one or more engine components based on at least one sensed engine temperature 306, a sensed rotor speed 308 of the gas turbine engine 20, and at least one gas path temperature 310 of the gas turbine engine 20. The projected oil-wetted metal temperature 318 can be determined based on at least one sensed oil temperature, such as the sensed MOT 316.

At block 604, controller 130 determines a coking index 320 based on the projected oil-wetted metal temperature 318 and a coking limit threshold 402 associated with one or more of the engine components. At block 606, the controller 130 triggers an oil coking mitigation action 324 as a shutdown management event of the gas turbine engine 20 based on the coking index 320. A sensed fuel temperature 326 in the fuel system 143 of the gas turbine engine 20 can be used to determine the oil coking mitigation action 324. For example, the oil coking mitigation action 324 can include increasing fuel recirculation within the fuel system 143 to increase oil-to-fuel heat transfer using the bypass valve 16 to recirculate fuel through line 15. The oil coking mitigation action 324 may include actuating fuel-return-to-tank valve 18 to reduce generator heat loading on the lubrication system 140 (e.g., effects of IDG 160). The oil coking mitigation action 324 can include increasing fuel flow beyond engine 20 demands to increase cooling capacity of the fuel system 143 with respect to the lubrication system 140 (e.g., intentional excess fuel burn/lower burn efficiency). The oil coking mitigation action 324 can further include opening an air/oil cooler valve 198 to increase air flow in the air/oil cooler 68 of the lubrication system 140. The oil coking mitigation action 324 may further include reducing or shifting electrical generator loads of the gas turbine engine 20, e.g., lower demand or shift demand from IDG 160 to another generator. The oil coking mitigation action 324 can also include increasing an idle dwell time prior to shutdown based on determining that the gas turbine engine 20 is operating in a test mode. Further, any combination of the disclosed mitigation options and additional mitigation options can be used to achieve the desired level and/or rate of oil coking mitigation.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
prior to shutdown of a gas turbine engine, predicting, by a processor, a projected oil-wetted metal temperature in a lubrication system of the gas turbine engine at shutdown based on one or more thermal models that predict one or more soak-back temperature projections of one or more engine components at or after shutdown of the gas turbine engine, wherein the one or more engine components comprise one or more bearing compartments;
determining, by the processor, a coking index based on the projected oil-wetted metal temperature and a coking limit threshold associated with the one or more engine components;

sensing a fuel temperature in a fuel system of the gas turbine engine, wherein the fuel system is in thermal communication with the lubrication system; and triggering an oil coking mitigation action as a shutdown management event of the gas turbine engine based on the coking index and a margin in the sensed fuel temperature to take additional heat transfer from oil in the lubrication system without risk of fuel coking, the oil coking mitigation action adjusting heat transfer associated with the lubrication system prior to shutdown of the gas turbine engine.

2. The method of claim 1, wherein the one or more thermal models determine one or more modeled temperatures of the one or more engine components based on at least one sensed engine temperature, a sensed rotor speed of the gas turbine engine, and at least one gas path temperature of the gas turbine engine.

3. The method of claim 1, wherein the projected oil-wetted metal temperature is determined based on at least one sensed oil temperature.

4. The method of claim 1, wherein the oil coking mitigation action comprises increasing fuel recirculation within the fuel system to increase oil-to-fuel heat transfer.

5. The method of claim 1, wherein the oil coking mitigation action comprises actuating a fuel-return-to-tank valve to reduce generator heat loading on the lubrication system.

6. The method of claim 1, wherein the oil coking mitigation action comprises increasing fuel flow beyond engine demands to increase cooling capacity of the fuel system with respect to the lubrication system.

7. The method of claim 1, wherein the oil coking mitigation action comprises opening an air/oil cooler valve to increase air flow in an air/oil cooler of the lubrication system.

8. The method of claim 1, wherein the oil coking mitigation action comprises reducing or shifting electrical generator loads of the gas turbine engine.

9. The method of claim 1, wherein the oil coking mitigation action comprises increasing an idle dwell time prior to shutdown based on determining that the gas turbine engine is operating in a test mode.

10. A thermal management system of a gas turbine engine, the thermal management system comprising:

a lubrication system comprising an oil flow path between a plurality of engine components, wherein the engine components comprise one or more bearing compartments;

a fuel system operable to deliver fuel for combustion within the gas turbine engine, wherein the fuel system is in thermal communication with the lubrication system; and a controller operable to:

predict, prior to shutdown of the gas turbine engine, a projected oil-wetted metal temperature in the lubrication system at shutdown of the gas turbine engine based on one or more thermal models that predict one or more soak-back temperature projections of one or more of the engine components at or after shutdown of the gas turbine engine;

determine a coking index based on the projected oil-wetted metal temperature and a coking limit threshold associated with one or more of the engine components;

sense a fuel temperature in the fuel system; and trigger an oil coking mitigation action as a shutdown management event of the gas turbine engine based on the coking index and a margin in the sensed fuel temperature to take additional heat transfer from oil in the lubrication system without risk of fuel coking, the oil coking mitigation action adjusting heat transfer associated with the lubrication system prior to shutdown of the gas turbine engine.

11. The thermal management system of claim 10, wherein the one or more thermal models determine one or more modeled temperatures of the one or more engine components based on at least one sensed engine temperature, a sensed rotor speed of the gas turbine engine, and at least one gas path temperature of the gas turbine engine.

12. The thermal management system of claim 10, wherein the projected oil-wetted metal temperature is determined based on at least one sensed oil temperature.

13. The thermal management system of claim 10, wherein the oil coking mitigation action comprises increasing fuel recirculation within the fuel system to increase oil-to-fuel heat transfer.

14. The thermal management system of claim 10, wherein the oil coking mitigation action comprises actuating a fuel-return-to-tank valve to reduce generator heat loading on the lubrication system.

15. The thermal management system of claim 10, wherein the oil coking mitigation action comprises increasing fuel flow beyond engine demands to increase cooling capacity of the fuel system with respect to the lubrication system.

16. The thermal management system of claim 10, wherein the oil coking mitigation action comprises opening an air/oil cooler valve to increase air flow in an air/oil cooler of the lubrication system.

17. The thermal management system of claim 10, wherein the oil coking mitigation action comprises reducing or shifting electrical generator loads of the gas turbine engine.

18. The thermal management system of claim 10, wherein the oil coking mitigation action comprises increasing an idle dwell time prior to shutdown based on determining that the gas turbine engine is operating in a test mode.

* * * * *